United States Patent
Kitagawa

(10) Patent No.: US 12,540,898 B2
(45) Date of Patent: Feb. 3, 2026

(54) LASER INTERFEROMETER

(71) Applicant: SEIKO EPSON CORPORATION, Tokyo (JP)

(72) Inventor: Jun Kitagawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 146 days.

(21) Appl. No.: 18/503,406

(22) Filed: Nov. 7, 2023

(65) Prior Publication Data

US 2024/0151643 A1    May 9, 2024

(30) Foreign Application Priority Data

Nov. 8, 2022 (JP) ................... 2022-178667

(51) Int. Cl.
*G01N 21/45* (2006.01)

(52) U.S. Cl.
CPC ... *G01N 21/45* (2013.01); *G01N 2201/06113* (2013.01)

(58) Field of Classification Search
None
See application file for complete search history.

(56) References Cited

U.S. PATENT DOCUMENTS

| | | |
|---|---|---|
| 2019/0293406 A1 | 9/2019 | Tomita et al. |
| 2023/0085489 A1 | 3/2023 | Yamada |

FOREIGN PATENT DOCUMENTS

| | | |
|---|---|---|
| JP | H08-035810 A | 2/1996 |
| JP | 2007-285898 A | 11/2007 |
| JP | 2019-168313 A | 10/2019 |
| JP | 2023-034683 A | 3/2023 |

OTHER PUBLICATIONS

"How do interferometric systems work?"; 50 Renishaw apply innovation; (renishaw.com); https://www.renishaw.com/en/how-do-interferometric-systems-work--38612; 2023 (3pp).

*Primary Examiner* — Michelle M Iacoletti
(74) *Attorney, Agent, or Firm* — Harness, Dickey & Pierce, P.L.C.

(57) ABSTRACT

Provided is a laser interferometer including: a laser light source configured to emit laser light; an optical modulator including a vibrator that has a light reflection surface and vibrates in response to a drive signal, the optical modulator being configured to overlap a modulation signal on the laser light by reflecting the laser light on the light reflection surface; and a photodetector configured to receive the laser light including a sample signal derived from an object and the modulation signal, and to output a light-receiving signal. When an inclination angle $\theta_{qom}$ is defined by a normal line of the light reflection surface and an incident optical axis of the laser light incident on the light reflection surface, the following Relationship (1) is satisfied.

$$0[\deg] < \theta_{qom} < 5.7[\deg] \qquad (1)$$

12 Claims, 7 Drawing Sheets

LASER INTERFEROMETER

The present application is based on, and claims priority from JP Application Serial Number 2022-178667, filed Nov. 8, 2022, the disclosure of which is hereby incorporated by reference herein in its entirety.

BACKGROUND

1. Technical Field

The present disclosure relates to a laser interferometer.

2. Related Art

JP-A-2007-285898 discloses a laser vibrometer as a device that measures a vibration velocity of an object. In the laser vibrometer, the to-be-measured object is irradiated with laser light, and the vibration velocity is measured based on Doppler-shifted scattered laser light.

The laser vibrometer disclosed in JP-A-2007-285898 includes a vibrator that generates a predetermined frequency. The vibrator shifts a frequency of the incident laser light based on the vibration frequency, and generates reflected laser light having a frequency different from that of the incident laser light. In the laser vibrometer, the reflected laser light is used as reference light. A beat signal is electrically extracted by receiving light obtained by combining the scattered laser light derived from the to-be-measured object and the reference light by a photodetector. The vibration velocity of the to-be-measured object is measured based on the beat signal.

However, in a laser light source, laser oscillation may be unstable due to return light entering. The return light refers to light that unintentionally returns toward the laser light source when the laser light emitted from the laser light source is reflected by an optical component. When the laser oscillation becomes unstable, quality of the laser light deteriorates. Accordingly, in the laser vibrometer, a signal-to-noise ratio (S/N ratio) decreases, and a phase of the laser light becomes discontinuous. As a result, measurement accuracy of the vibration velocity of the object decreases.

As a technique for preventing the return light, a non-coaxial optical system is known. The non-coaxial optical system is an optical system in which a reflection surface of an optical component is inclined such that light incident on the optical component (incident light) and light obtained by being reflected by the optical component (reflected light) propagate along axes different from each other. Since the reflection surface is inclined, even if a part of the reflected light returns toward the laser light source, the part of the reflected light returns to a position that deviates from the laser light source. Therefore, it is possible to prevent the return light from entering an emission portion of the laser light.

It is considered that destabilization of the laser oscillation due to the return light can be prevented by applying the non-coaxial optical system described above to the laser vibrometer.

When the non-coaxial optical system is applied to the laser vibrometer disclosed in JP-A-2007-285898, a normal line of the reflection surface provided at the vibrator and an optical axis of the incident light may be non-parallel. However, in that case, the laser light reflected by the reflection surface includes not only a component in which a frequency is shifted relative to the incident laser light, but also a component in which a frequency is not shifted (unmodulated component).

As a result of the examination performed by an inventor, it is understood that the unmodulated component becomes noise and decreases the S/N ratio of the beat signal. Therefore, there is a problem to prevent the decrease in the S/N ratio due to the unmodulated component when the non-coaxial optical system is applied to the laser vibrometer.

SUMMARY

A laser interferometer according to an application example of the present disclosure includes:

a laser light source configured to emit laser light;

an optical modulator including a vibrator that vibrates in response to a drive signal and a light reflection surface provided at the vibrator, the optical modulator being configured to overlap a modulation signal on the laser light by reflecting the laser light on the light reflection surface that vibrates; and a photodetector configured to receive the laser light including a sample signal derived from an object and the modulation signal, and to output a light-receiving signal, in which $$0[\deg] < \theta_{qom} < 5.7[\deg] \tag{1}$$

the above Relationship (1) is satisfied, where an angle defined by a normal line of the light reflection surface and an incident optical axis of the laser light incident on the light reflection surface is an inclination angle $\theta_{qom}$.

DESCRIPTION OF EMBODIMENTS

Figure 1:
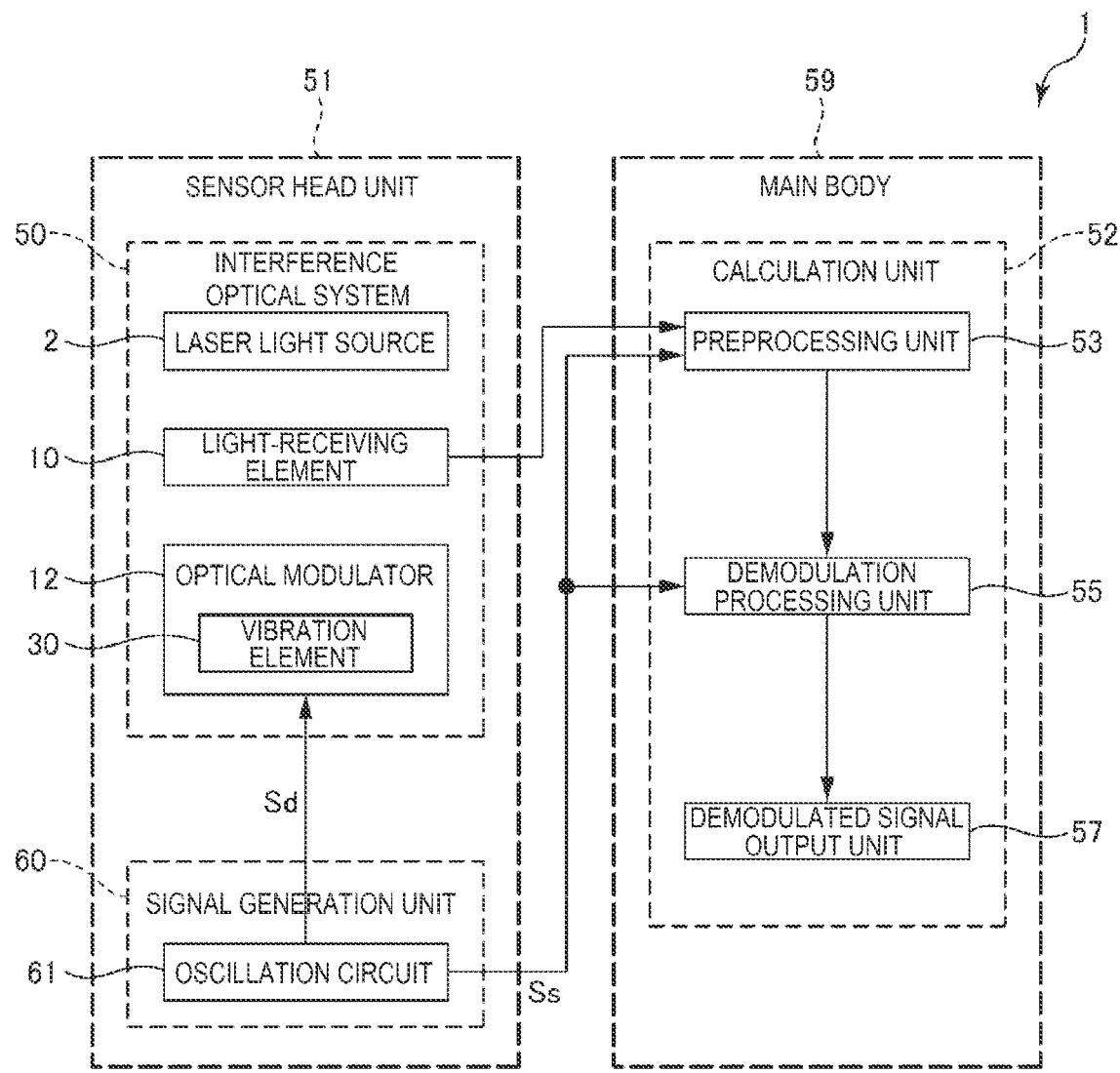
FIG. 1 is a functional block diagram showing a laser interferometer according to an embodiment.
Figure 2:
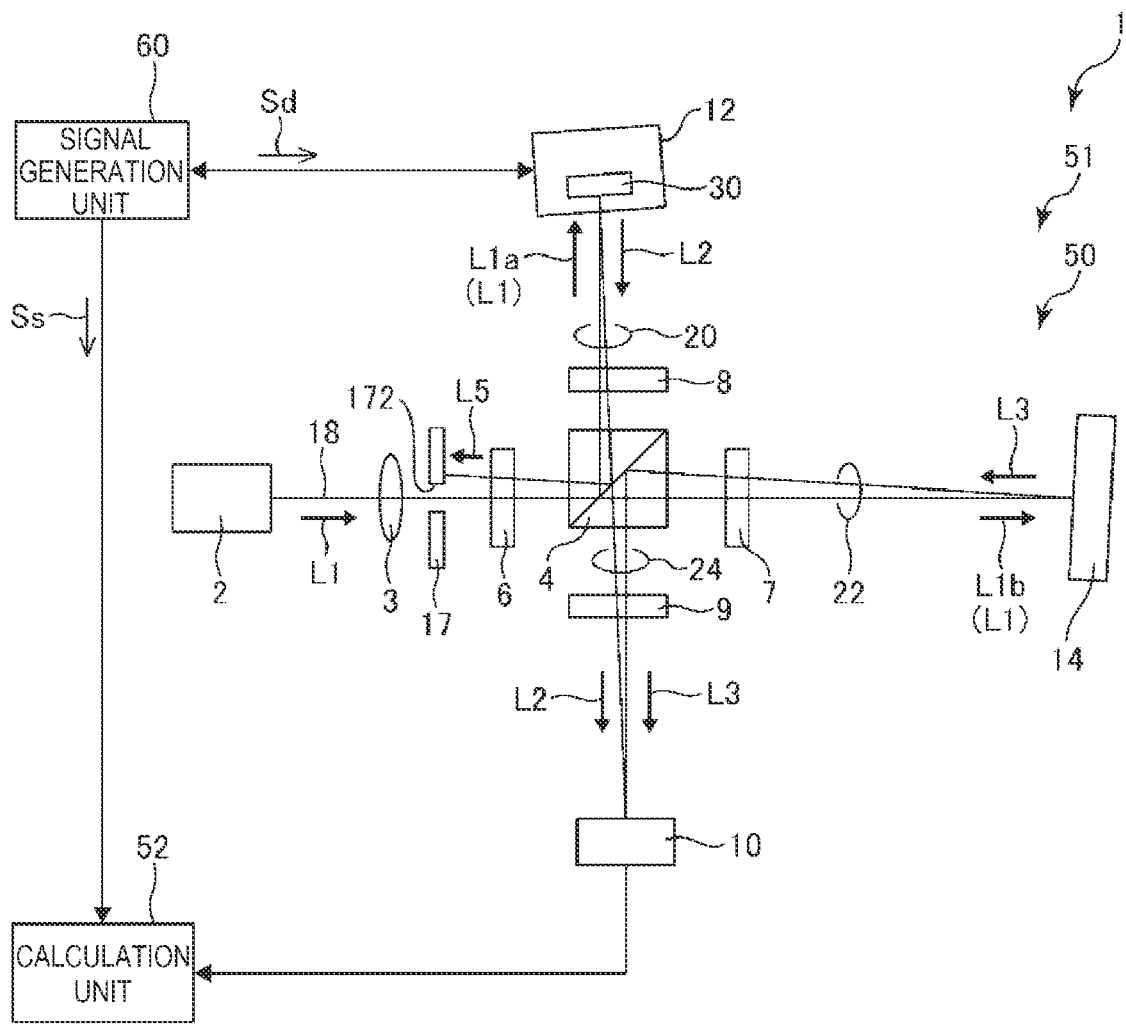
FIG. 2 is a schematic configuration diagram showing a sensor head unit provided in the laser interferometer in FIG. 1.

Hereinafter, a laser interferometer according to the present disclosure will be described in detail based on an embodiment shown in the accompanying drawings. FIG. 1 is a functional block diagram showing a laser interferometer 1 according to the embodiment. FIG. 2 is a schematic configuration diagram showing a sensor head unit 51 provided in the laser interferometer 1 in FIG. 1.

The laser interferometer 1 shown in FIG. 1 measures, for example, displacement and a speed of an object 14 shown in FIG. 2, by irradiating the object 14 with the laser light and detecting the reflected laser light.

The laser interferometer 1 shown in FIG. 1 includes the sensor head unit 51 and a main body 59. The sensor head unit 51 shown in FIG. 1 includes an interference optical system 50 and a signal generation unit 60. Since the sensor head unit 51 is easy in miniaturization and weight reduction and is easy to be transported and installed, for example, the sensor head unit 51 can be disposed near the object 14 shown in FIG. 2 that is a measurement target of the laser interferometer 1.

The main body 59 includes a calculation unit 52. The main body 59 can be disposed away from the sensor head unit 51, and for example, may be housed in a rack or the like.

1. Sensor Head Unit

The sensor head unit 51 shown in FIG. 1 includes the interference optical system 50 and the signal generation unit 60.
1.1 Interference Optical System The interference optical system 50 shown in FIG. 2 is a Michelson interference optical system. The interference optical system 50 includes a laser light source 2, a collimating lens 3, a light shield 17, a light splitter 4, a half-wave plate 6, a quarter-wave plate 7, a quarter-wave plate 8, an analyzer 9, a light-receiving element 10, and an optical modulator 12.

The laser light source 2 emits emission light L1 (laser light). The light-receiving element 10 converts received light into an electrical signal. The optical modulator 12 includes a vibrator 30, changes a frequency of the emission light L1, and generates reference light L2 including a modulation signal (laser light including a modulation signal). The emission light L1 incident on the object 14 is reflected as object light L3 including a sample signal that is a Doppler signal derived from the object 14 (laser light including a sample signal).

An optical path that couples the light splitter 4 to the laser light source 2 is referred to as an optical path 18. An optical path that couples the light splitter 4 to the optical modulator 12 is referred to as an optical path 20. An optical path that couples the light splitter 4 to the object 14 is referred to as an optical path 22. An optical path that couples the light splitter 4 to the light-receiving element 10 is referred to as an optical path 24. The "optical path" in the specification refers to a path that is set between optical components and along which light travels.

On the optical path 18, the half-wave plate 6, the light shield 17, and the collimating lens 3 are disposed in this order from the light splitter 4. The quarter-wave plate 8 is disposed on the optical path 20. The quarter-wave plate 7 is disposed on the optical path 22. The analyzer 9 is disposed on the optical path 24.

The emission light L1 emitted from the laser light source 2 is split into two by the light splitter 4 via the optical path 18. First split light L1a that is one part of the emission light L1 is incident on the optical modulator 12 via the optical path 20. Further, second split light L1b that is the other part of the emission light L1 is incident on the object 14 via the optical path 22. The reference light L2 generated by a frequency shifted by the optical modulator 12 is incident on the light-receiving element 10 via the optical path 20 and the optical path 24. The object light L3 obtained by being reflected on the object 14 is incident on the light-receiving element 10 via the optical path 22 and the optical path 24.

The "optical path" in the specification refers to the path that is set between optical components and along which light travels. Further, an "optical axis" to be described later refers to a central axis of light flux that passes through the optical path.

In the interference optical system 50 as described above, phase information on the object 14 is obtained by optical heterodyne interferometry. Specifically, two beams of light (the reference light L2 and the object light L3) having slightly different frequencies are allowed to interfere with each other, and the phase information is extracted from obtained interference light. The displacement of the object 14 is obtained from the phase information in the calculation unit 52 to be described later. According to the optical heterodyne interferometry, when the phase information is extracted from the interference light, it is less likely to be influenced by disturbance, particularly stray light having a frequency that is noise, and high robustness is given.

Hereinafter, parts of the interference optical system 50 will be further described.
1.1.1. Laser Light Source The laser light source 2 is a laser light source that emits the emission light L1 having coherence. A light source having a line width of an MHz band or less is preferably used for the laser light source 2. Specifically, examples of the laser light source 2 include: a gas laser such as a He—Ne laser, a distributed feedback-laser diode (DFB-LD), a laser diode with fiber bragg grating (FBG-LD), a vertical cavity surface emitting laser (VCSEL), and a semiconductor laser element such as a Fabry-Perot laser diode (FP-LD).

It is preferable that the laser light source 2 be particularly the semiconductor laser element. Accordingly, the laser light source 2 can be particularly miniaturized. Therefore, the laser interferometer 1 can be miniaturized. Particularly, since in the laser interferometer 1, miniaturization and weight reduction of the sensor head unit 51 where the interference optical system 50 is housed are achieved, the miniaturization of the laser interferometer 1 is useful in that operability of the laser interferometer 1 such as installation freedom of the sensor head unit 51 can be improved.
1.1.2. Collimating Lens The collimating lens 3 is an optical element disposed between the laser light source 2 and the light splitter 4, and an aspherical lens can be set as an example. The collimating lens 3 collimates the emission light L1 emitted from the laser light source 2. When the emission light L1 emitted from the laser light source 2 is sufficiently collimated, for example, when the gas laser such as the He—Ne laser is used as the laser light source 2, the collimating lens 3 may be omitted.

On the other hand, when the laser light source 2 is the semiconductor laser element, it is preferable to provide the collimating lens 3. Accordingly, since the emission light L1 is collimated light, it is possible to prevent an increase in size of various optical components that receive the emission light L1, and to miniaturize the laser interferometer 1.

The emission light L1 that is the collimated light is converted into linearly polarized light whose intensity ratio of P-polarized light to S-polarized light is, for example, 50:50 and is incident on the light splitter 4 by passing through the half-wave plate 6.

1.1.3. Light Shield

The light shield 17 is a diaphragm disposed between the collimating lens 3 and the light splitter 4. The light shield 17 has an opening 172 provided corresponding to the optical path 18. As shown in FIG. 2, the light shield 17 prevents return light L5 generated by the optical modulator 12, the object 14, or the like from being incident on the laser light source 2. The light shield 17 may be a member including a slit, a pinhole, or the like, and the structure is not particularly limited. Further, the light shield 17 may be provided when necessary, and may be omitted.

1.1.4. Light Splitter

The light splitter 4 is a polarization beam splitter disposed between the laser light source 2 and the optical modulator 12, and between the laser light source 2 and the object 14. The light splitter 4 has a function of allowing P-polarized light to be transmitted and reflecting S-polarized light. With the function, the light splitter 4 splits the emission light L1 into the first split light L1a that is reflected light at the light splitter 4, and the second split light L1b that is transmitted light of the light splitter 4.

The first split light L1a that is the S-polarized light reflected by the light splitter 4 is converted into a circularly polarized light by the quarter-wave plate 8, and is incident on the optical modulator 12. The first split light L1a incident on the optical modulator 12 is subjected to a frequency shift of $f_m$ [Hz], and is reflected as the reference light L2. Therefore, the reference light L2 includes a modulation signal having the frequency $f_m$ [Hz]. When transmitting through the quarter-wave plate 8 again, the reference light L2 is converted into the P-polarized light. The P-polarized light of the reference light L2 transmits through the light splitter 4 and the analyzer 9, and is incident on the light-receiving element 10.

The second split light L1b that is the P-polarized light transmitted through the light splitter 4 is converted into the circularly polarized light by the quarter-wave plate 7, and is incident on the object 14 in a moving state. The second split light L1b incident on the object 14 is subjected to a Doppler shift of $f_d$ [Hz], and is reflected as the object light L3. Therefore, the object light L3 includes a sample signal having the frequency $f_d$[Hz]. When transmitting through the quarter-wave plate 7 again, the object light L3 is converted into the S-polarized light. The S-polarized light of the object light L3 is reflected by the light splitter 4, transmits through the analyzer 9, and is incident on the light-receiving element 10.

Since the emission light L1 has the coherence, the reference light L2 and the object light L3 are incident on the light-receiving element 10 as the interference light. Therefore, in other words, the light splitter 4 has a function of splitting the emission light L1 into one part (first split light L1a) and the other part (second split light L1b), a function of irradiating the optical modulator 12 with the first split light L1a, and irradiating the object 14 with the second split light L1b, and a function of mixing the reference light L2 that returns from the optical modulator 12 with the object light L3 that returns from the object 14. Accordingly, since the laser light can be split and mixed by the light splitter 4, a space of the interference optical system 50 can be saved, which can contribute to the miniaturization of the laser interferometer 1.

A non-polarization beam splitter may be used instead of the polarization beam splitter. In this case, since the half-wave plate 6, the quarter-wave plate 7, the quarter-wave plate 8, and the like are not necessary, it is possible to achieve the miniaturization of the laser interferometer 1 based on a reduction in the number of components. Further, a light splitter other than the beam splitter may be used.

1.1.5. Analyzer

Since the S-polarized light and the P-polarized light orthogonal to each other are independent of each other, a beat due to interference does not appear if the S-polarized light and the P-polarized light are simply overlapped. Therefore, a light wave obtained by overlapping the S-polarized light with the P-polarized light passes through the analyzer 9 inclined at 45° with respect to both the S-polarized light and the P-polarized light. When the analyzer 9 is used, it is possible to transmit light of components common to each other, and to generate the interference. As a result, at the analyzer 9, the reference light L2 and the object light L3 interfere with each other, and interference light having a frequency of $|f_m - f_d|$[Hz] is generated.

1.1.6. Light-Receiving Element

When the interference light is incident on the light-receiving element 10, the light-receiving element 10 outputs a photocurrent (light-receiving signal) corresponding to an intensity of the interference light. The sample signal is demodulated from the light-receiving signal by a method to be described later, so that movement, that is, the displacement and the speed of the object 14 can be finally obtained. Examples of the light-receiving element 10 include a photodiode. Light received by the light-receiving element 10 may be light including the sample signal and the modulation signal, and is not limited to the interference light described above. Further, "the sample signal is demodulated from the light-receiving signal" in the specification includes demodulating the sample signal from various signals converted from the photocurrent (light-receiving signal).

1.1.7. Optical Modulator

Next, the optical modulator 12 including the vibrator 30 will be described.

1.1.7.1. Optical Modulation Using Vibrator

First, a principle of modulating the light by using the vibrator 30 will be described.

Figure 3:
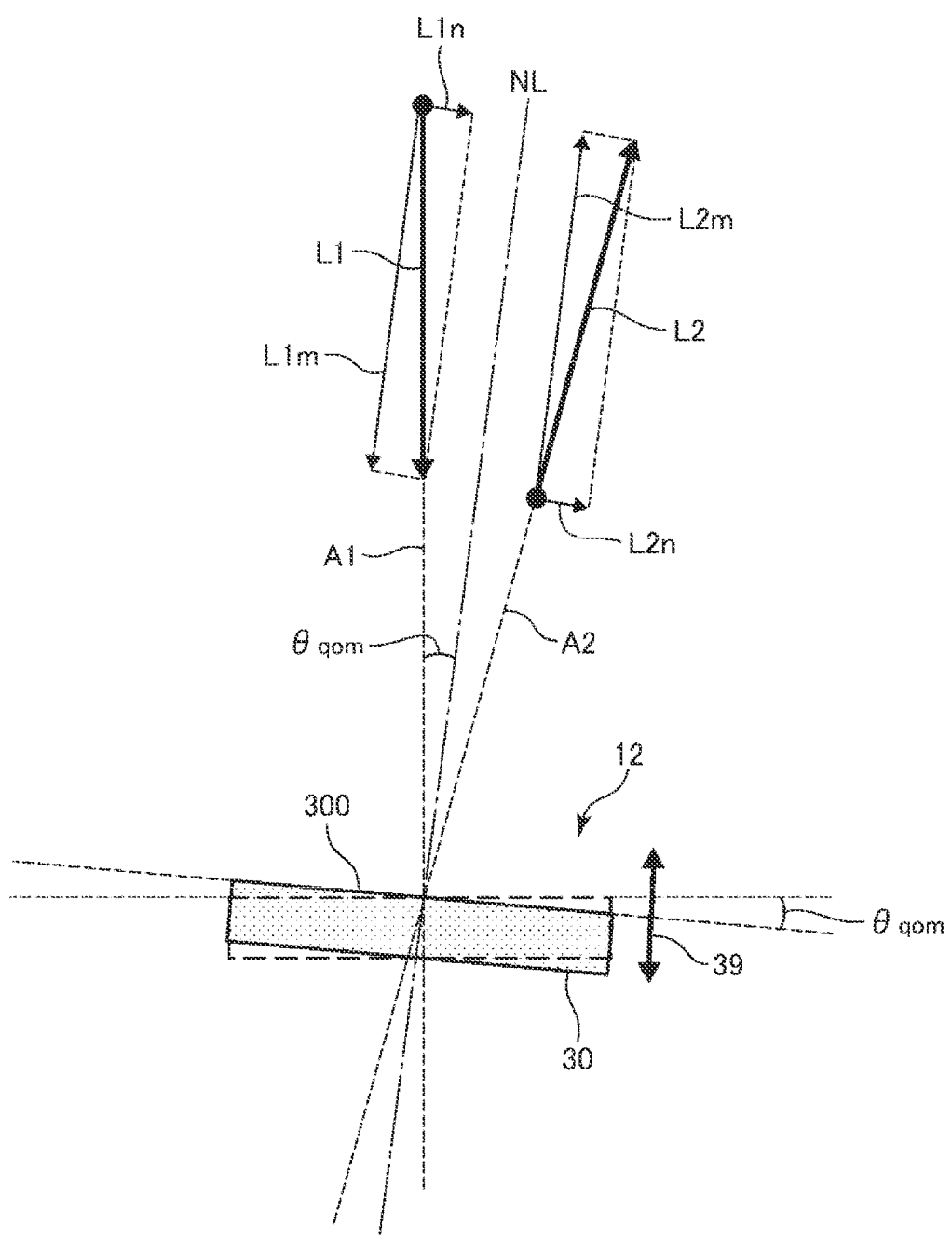
FIG. 3 is a schematic diagram showing a principle of an optical modulator shown in FIG. 2 that generates reference light L2 including a modulation signal (laser light including the modulation signal).

FIG. 3 is a schematic diagram showing a principle of the optical modulator 12 shown in FIG. 2 that generates the reference light L2 including the modulation signal (the laser light including the modulation signal).

A light reflection surface 300 that reflects the emission light L1 emitted from the laser light source 2 is provided at the vibrator 30 shown in FIG. 3. The vibrator vibrates the light reflection surface 300 along a vibration direction 39. Accordingly, when the emission light L1 is reflected by the light reflection surface 300, the frequency is shifted, and the reference light L2 including the modulation signal is generated. That is, the optical modulator 12 overlaps the modulation signal on the emission light L1.

1.1.7.2. Range of Inclination Angle $\theta_{qom}$

When an angle defined by a normal line NL of the light reflection surface 300 and an incident optical axis A1 of the emission light L1 incident on the light reflection surface 300 is referred to as an "inclination angle $\theta_{qom}$", the inclination angle $\theta_{qom}$ is larger than 0 [deg] in the embodiment. That is, a posture of the optical modulator 12 is set such that the normal line NL is inclined with respect to the incident optical axis A1 so that the emission light L1 is not vertically incident on the light reflection surface 300 but obliquely incident thereon.

Accordingly, an angle defined by the normal line NL of the light reflection surface 300 and an emission optical axis A2 of the reference light L2 emitted from the light reflection surface 300 is also the same as the inclination angle $\theta_{qom}$ described above. As a result, the incident optical axis A1 and the emission optical axis A2 are not the same, but different from each other as shown in FIG. 3. That is, in the embodiment, the interference optical system 50 is a non-coaxial optical system. Accordingly, in the interference optical system 50, even if the reference light L2 faces the laser light source 2 as the return light unintentionally after being reflected by the light splitter 4, the reference light L2 reaches a position that deviates from an emission point of the emission light L1. Therefore, it is possible to prevent destabilization of laser oscillation in the laser light source 2. The emission point refers to a center point of a surface where the emission light L1 is emitted.

On the other hand, efficiency of the optical modulation of the optical modulator 12 is the maximum when a direction of an incident vector of the emission light L1 incident on the light reflection surface 300 and a direction of an emission vector of the reference light L2 emitted from the light reflection surface 300 are opposite to each other. That is, in the non-coaxial optical system, the efficiency of the optical modulation is slightly lower than a maximum value, and a component not optically modulated is included in the reference light L2.

FIG. 3 shows an image where the emission light L1 incident on the light reflection surface 300 is conceptually decomposed into an optically modulated component (modulated component L1m) and a component not optically modulated (unmodulated component L1n). The modulated component L1m shown in FIG. 3 is optically modulated since the modulated component L1m is parallel to the normal line NL. On the other hand, the unmodulated component L1n is not optically modulated since the unmodulated component L1n is orthogonal to the normal line NL.

When such emission light L1 is reflected by the light reflection surface 300, the reference light L2 emitted from the light reflection surface 300 can also be conceptually decomposed into an optically modulated component (modulated component L2m) and a component not optically modulated (unmodulated component L2n). FIG. 3 shows the image. The modulated component L2m shown in FIG. 3 is optically modulated with maximum efficiency since the modulated component L2m is parallel to the normal line NL. On the other hand, the unmodulated component L2n is not optically modulated since the unmodulated component L2n is orthogonal to the normal line NL.

As described above, not only the modulated component L2m, but also the unmodulated component L2n are included in the reference light L2. It is difficult to geometrically and optically separate and remove the unmodulated component L2n. Therefore, the unmodulated component L2n eventually becomes a noise component in the light-receiving signal output from the light-receiving element 10, and causes a decrease in an S/N ratio.

Therefore, as a result of examination performed by an inventor, it is found that when the inclination angle $\theta_{qom}$ satisfies the following Relationship (1), the decrease in the S/N ratio of the light-receiving signal due to the unmodulated component can be prevented while preventing the destabilization of the laser oscillation of the laser light source 2.

$$0[\deg] < \theta_{qom} < 5.7[\deg] \quad (1)$$

Accordingly, since the decrease in the S/N ratio of the light-receiving signal can be prevented, when the displacement and the speed of the object 14 are measured by the laser interferometer 1, sufficiently high measurement accuracy can be achieved.

When the inclination angle $\theta_{qom}$ falls below a lower limit value of Relationship (1) described above, the interference optical system 50 is not the non-coaxial optical system. Therefore, when a part of the reference light L2 becomes the return light, the return light may reach an emission portion of the laser light source 2. As a result, the laser oscillation destabilizes in the laser light source 2. On the other hand, when the inclination angle $\theta_{qom}$ exceeds an upper limit value of Relationship (1) described above, the unmodulated component L2n becomes obvious, and the decrease in the S/N ratio of the light-receiving signal may exceed an allowable range.

Further, it is also found that the inclination angle $\theta_{qom}$ preferably satisfies the following Relationship (2).

$$0[\deg] < \theta_{qom} < 1.8[\deg] \quad (2)$$

Accordingly, the decrease in the S/N ratio of the light-receiving signal can be further reduced. As a result, when the displacement and the speed of the object 14 are measured by the laser interferometer 1, higher measurement accuracy can be achieved.

1.1.7.3. Significance of Upper Limit Value of Inclination Angle $\theta_{qom}$

Here, significance of the upper limit value of Relationship (1) described above will be described.

First, a case where the inclination angle $\theta_{qom}$ is 0 [deg] will be described. In this case, the unmodulated components L1n and L2n are not generated. Accordingly, an electric field intensity $E_r$ of the reference light L2 emitted from the light reflection surface 300 of the optical modulator 12 is represented by the following Equation (A).

$$E_r = a_r \cos\left(\omega_0 t + 2\pi \int f_{M(t)} dt\right) \quad (A)$$

In Equation (A) described above, $a_r$ is light amplitude of the reference light L2, $\omega_0$ is an angular frequency of the emission light L1, and $f_{M(t)}$ is a frequency shift amount of the optical modulator 12.

Next, a case where the inclination angle $\theta_{qom}$ is larger than 0 [deg] will be described. In this case, as shown in the following Equations (B-1) and (B-2), the electric field intensity $E_r$ of the reference light L2 can be vector-decomposed into a component $E_{rv}$ vertical to the light reflection surface 300 and a component $E_{rp}$ parallel to the light reflection surface 300.

$$\vec{E}_{rv} = a_r \cos\theta_{qom} \cos(\omega_0 t + 2\pi \int f_{M(t)} dt)\vec{e}_v \quad (B-1)$$

$$\vec{E}_{rp} = a_r \sin\theta_{qom} \cos(\omega_0 t)\vec{e}_p \quad (B-2)$$

$e_V$ in Equation (B-1) described above is a unit vector vertical to the light reflection surface 300. $e_p$ in Equation (B-2) described above is a unit vector parallel to the light reflection surface 300.

Further, the following Equation (C) is established between the vertical component $E_{rv}$ and the parallel component $E_{rp}$.

$$|\vec{E}_r| = \sqrt{|\vec{E}_{rv}|^2 + |\vec{E}_{rp}|^2} \quad (C)$$

Equations (B-1) and (B-2) described above are convenient expressions for dividing the electric field intensity into a signal component and a noise component. Equation (B-1)

described above indicates the signal component, and Equation (B-2) described above indicates the noise component.

Since light intensity $P_{ref}$ of the reference light L2 is given by a square of the electric field intensity, the light intensity $P_{ref}$ is represented by the following Equation (D).

$$P_{ref}=|\vec{E}_r|^2=|\vec{E}_{rv}|^2+|\vec{E}_{rp}|^2=P_{ref}\cos\theta_{qom}{}^2+P_{ref}\sin\theta_{qom}{}^2 \quad (D)$$

As represented by Equation (D) described above, a ratio of the signal component to the noise component of the light intensity $P_{ref}$ of the reference light L2 is $\cos\theta_{qom}{}^2 : \sin\theta_{qom}{}^2$.

Next, the interference light incident on the light-receiving element 10 will be described.

As described above, the reference light L2 and the object light L3 are incident on the light-receiving element 10 as the interference light. An electric field intensity $E_s$ of the object light L3 is represented by the following Equation (E).

$$E_s=a_s\cos(\omega_0 t+2\pi\int f_{d(t)}dt) \quad (E)$$

Accordingly, the electric field intensities of the reference light L2 and the object light L3 are given by Equations (A) and (E) described above.

Here, in the optical heterodyne interferometry, the phase information is extracted from an alternating-current component of the light intensity of the interference light, that is, a "beat signal component".

Since a light intensity $I_0$ of the interference light is represented by a square of time average of the electric field intensity, the following Equation (F) is derived from Equations (A) and (E) described above.

$$I_o=<|E_r+E_s|^2>=a_r a_s \cos 2\pi(\int f_{M(t)}-f_{d(t)}dt) \quad (F)$$

However, since the light intensity $I_0$ represented by Equation (F) described above is based on Equation (A) described above, the light intensity $I_0$ corresponds to a case where the inclination angle $\theta_{qom}$ is 0 [deg].

On the contrary, when the inclination angle $\theta_{qom}$ is larger than 0 [deg], the following Equation (G) is derived from Equations (D) and (E) described above.

$$I_q=<|E_{rp}+E_s|^2>=a_r a_s \cos\theta_{qom}\cos 2\pi(\int f_{M(t)}-f_{d(t)}dt) \quad (G)$$

A light intensity $I_q$ represented by Equation (G) described above corresponds to a case where the inclination angle $\theta_{qom}$ is larger than 0 [deg]. According to Equations (F) and (G) described above, it is understood that the intensity of the beat signal component included in the light intensity of the interference light is attenuated by $\cos\theta_{qom}$ times the intensity when the inclination angle $\theta_{qom}$ is 0 [deg] as a result of making the inclination angle $\theta_{qom}$ larger than 0 [deg].

Based on the above description, a proportion of the intensity of the noise component to the intensity of the beat signal component (noise ratio $\eta_N$) is given by the following Equation (H).

$$\eta_N = \frac{a_r^2}{a_r a_s} \cdot \frac{\sin\theta_{qom}^2}{\cos\theta_{qom}} = \frac{\sin\theta_{qom}^2}{\cos\theta_{qom}} \quad (H)$$

In Equation (H) described above, it is assumed that the light amplitude of the reference light L2 and the light amplitude of the object light L3 coincide with each other, that is, $a_r=a_s$ is established.

Figure 4:
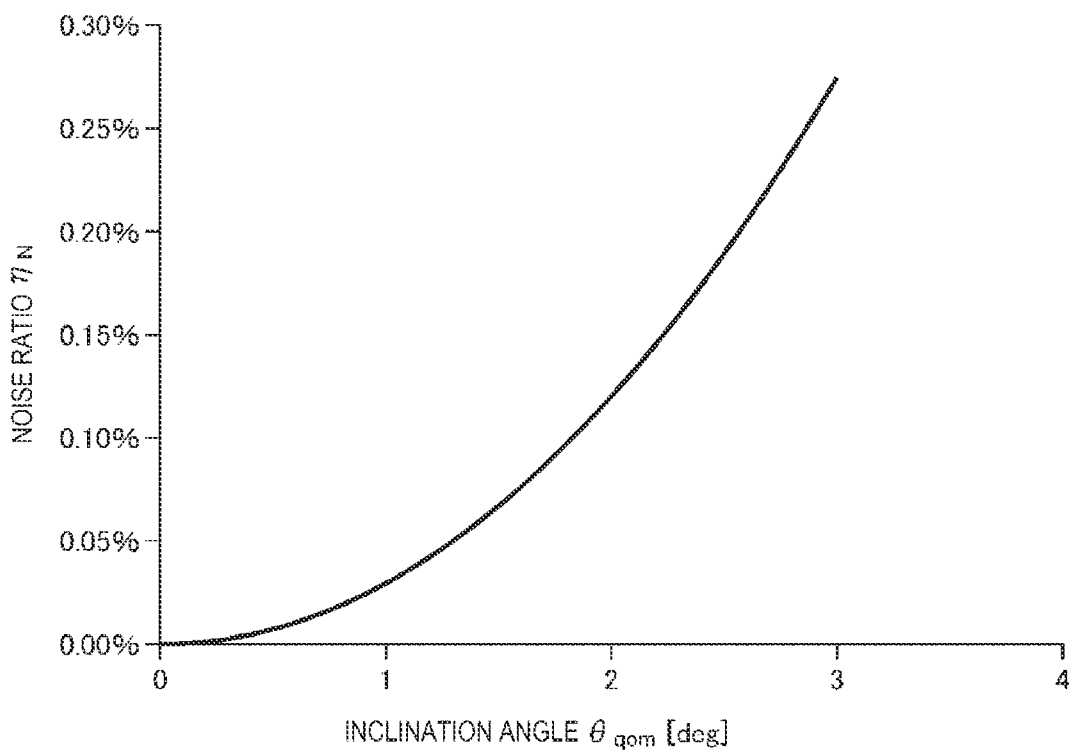
FIG. 4 is a graph showing a relationship between an inclination angle $\theta_{qom}$ and a noise ratio $\eta_N$.

FIG. 4 is a graph showing a relationship between the inclination angle $\theta_{qom}$ and the noise ratio $\eta_N$. As shown in FIG. 4, the noise ratio $\eta_N$ quadratically increases according to an increase in the inclination angle $\theta_{qom}$. Therefore, it is necessary to set an upper limit value for the inclination angle $\theta_{qom}$. Therefore, the allowable noise ratio $\eta_N$ will be examined.

Figure 5:
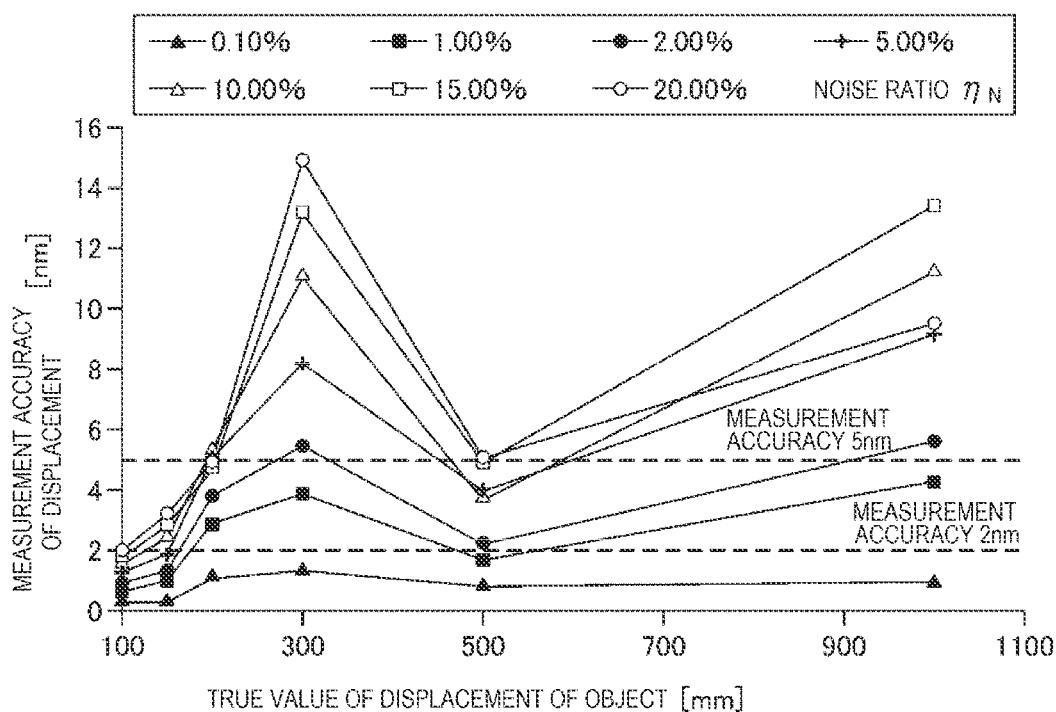
FIG. 5 is a graph showing a true value and a measurement accuracy of displacement of an object when the displacement is measured by the laser interferometer while changing the noise ratio $\eta_N$ in seven steps.

FIG. 5 is a graph showing a true value and the measurement accuracy of the displacement when the displacement of the object 14 is measured by the laser interferometer 1 while changing the noise ratio $\eta_N$ in seven steps. A horizontal axis of the graph shown in FIG. 5 indicates the true value of the displacement of the object 14, and a vertical axis indicates the measurement accuracy when the displacement is measured by the laser interferometer 1.

As shown in FIG. 5, when the noise ratio $\eta_N$ increases, the measurement accuracy deteriorates accordingly. However, if the measurement accuracy is 5 nm or less, it can be considered that there is sufficient accuracy, and it can be said that the measurement accuracy is within the allowable range.

As can be read from FIG. 5, when the noise ratio $\eta_N$ is 1.00% or less, it is possible to achieve a measurement accuracy of 5 nm or less regardless of the displacement of the object 14. Therefore, the following Relationship (J) is derived.

$$\frac{\sin\theta_{qom}^2}{\cos\theta_{qom}} < 1[\%] \quad (J)$$

$$\theta < 5.7[deg]$$

As described above, the upper limit value of Relationship (1) is obtained.

Further, if the measurement accuracy is 2 nm or less, it can be considered that there is higher accuracy.

As can be read from FIG. 5, when the noise ratio $\eta_N$ is 0.10% or less, it is possible to achieve a measurement accuracy of 2 nm or less regardless of the displacement of the object 14. Therefore, the following Relationship (K) is derived.

$$\frac{\sin\theta_{qom}^2}{\cos\theta_{qom}} < 0.1[\%] \quad (K)$$

$$\theta < 1.8[deg]$$

As described above, the upper limit value of Relationship (2) is obtained.

1.1.7.4. Significance of Lower Limit Value of Inclination Angle $\theta_{qom}$

On the other hand, the inclination angle $\theta_{qom}$ preferably satisfies the following Relationship (3).

$$\frac{1}{2}\tan^{-1}\left(\frac{\phi_K}{L_q}+\frac{\lambda}{\phi_K}\right) < \theta_{qom} \quad (3)$$

When the inclination angle $\theta_{qom}$ falls below the lower limit value of Relationship (3) described above, in a case where a part of the reference light L2 becomes the return light L5, the return light L5 may reach the emission portion of the laser light source 2.

Hereinafter, a derivation process of Relationship (3) described above will be described.

Figure 6:
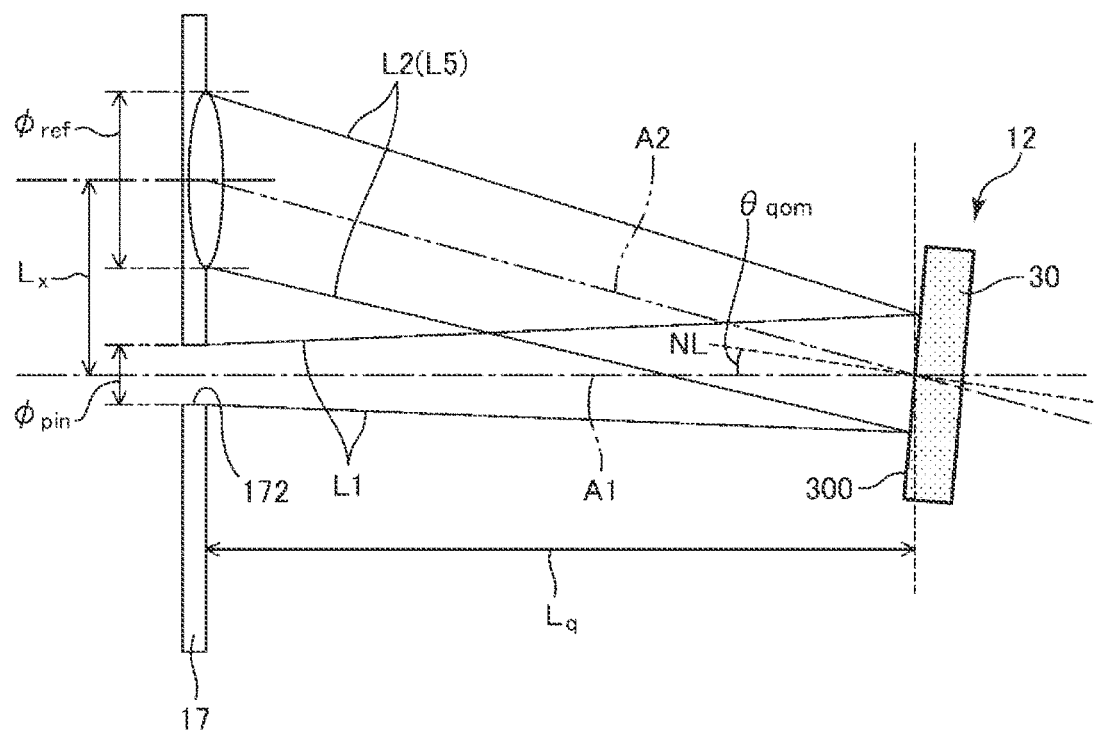
FIG. 6 is an enlarged view of a part of an interference optical system in FIG. 2, and is a view in which only a light shield and the optical modulator are shown and a positional relationship is shown in a simplified manner.

FIG. 6 is an enlarged view of a part of the interference optical system 50 in FIG. 2, and is a view in which only the light shield 17 and the optical modulator 12 are shown and a positional relationship is shown in a simplified manner. In FIG. 6, for convenience of illustration, the optical path bent by 90° via reflection at the light splitter 4 in FIG. 2 is linearly shown.

The emission light L1 emitted from the laser light source 2 is collimated by the collimating lens 3, and a light flux diameter of the emission light L1 is narrowed down by the light shield 17. However, the emission light L1 that passes through the light shield 17 gradually diffuses due to a light diffraction phenomenon.

Generally, when a light flux diameter of a light source is r, and a radiation angle of a light ray emitted from the light source is θ [rad], a light flux diameter R of a light ray at a distance x from the light source is obtained by the following Equation (a).

$$R = r + \theta x \quad (a)$$

Since the radiation angle θ of the laser light generally satisfies θ<<1, Equation (a) described above can be rewritten as the following Equation (b).

$$R = r + \frac{x}{r}\lambda \quad (b)$$

λ in Equation (b) described above indicates a wavelength of the light ray. When Equation (b) described above is applied to the interference optical system 50 shown in FIG. 2, the following Equation (c) is established.

$$\phi_{ref} = \phi_{pin} + \frac{2L_q}{\phi_{pin}}\lambda \quad (c)$$

In Equation (c) described above, $\varphi_{ref}$ is a light flux diameter when the reference light L2 reaches the light shield 17. $\varphi_{pin}$ is a diameter of the opening 172 of the light shield 17. $L_q$ is a physical distance between the light shield 17 and the light reflection surface 300 of the optical modulator 12. Since the inclination angle $\theta_{qom}$ described above is a very small angle, a propagation distance until the emission light L1 that passes through the light shield 17 reaches the light reflection surface 300 and a propagation distance until the reference light L2 reaches the light shield 17 are approximated to be twice the $L_q$ in Equation (c) described above. Further, in Equation (c) described above, λ indicates a wavelength of the emission light L1.

Accordingly, at a position of the light shield 17, a deviation amount $L_x$ between the optical axis of the emission light L1 and the optical axis of the reference light L2 is represented by the following Equation (d).

$$L_x = L_q \tan 2\theta_{qom} \quad (d)$$

If the deviation amount $L_x$ is larger than a sum of a radius ($\varphi_{pin}/2$) of the opening 172 of the light shield 17 and a half ($\varphi_{ref}/2$) of the light flux diameter of the reference light L2, the reference light L2 is prevented from passing through the opening 172. Therefore, in the interference optical system 50, the following Relationship (e) is preferably established.

$$\frac{\phi_{pin}}{2} + \frac{\phi_{ref}}{2} < L_x \quad (e)$$

Accordingly, when Equation (d) described above is substituted into Relationship (e) described above, the following Relationship (f) is derived.

$$\phi_{pin} + \frac{L_q}{\phi_{pin}}\lambda < L_q \tan 2\theta_{qom} \quad (f)$$

When Relationship (f) described above is rearranged with the inclination angle $\theta_{qom}$, the following Relationship (g) is derived.

$$\frac{1}{2}\tan^{-1}\left(\frac{\phi_{pin}}{L_q} + \frac{\lambda}{\phi_{pin}}\right) < \theta_{qom} \quad (g)$$

When the light shield 17 is omitted, $\varphi_{pin}$ can be replaced with an effective diameter of the collimating lens 3, and when the collimating lens 3 is also omitted, $\varphi_{pin}$ can be replaced with a diameter of the emission portion of the laser light source 2.

Therefore, a concept including the opening 172 of the light shield 17, the effective diameter of the collimating lens 3, and the emission portion of the laser light source 2 is "an effective diameter $\varphi_x$ of the emission light L1". It can be considered that the return light L5 may preferably not reach the effective diameter $\varphi_x$ of the emission light L1.

Accordingly, Relationship (g) described above can be rewritten as the following Relationship (3).

$$\frac{1}{2}\tan^{-1}\left(\frac{\phi_\kappa}{L_q} + \frac{\lambda}{\phi_\kappa}\right) < \theta_{qom} \quad (3)$$

When the light shield 17 is omitted, $L_q$ is a physical distance between the collimating lens 3 and the light reflection surface 300, and when the collimating lens 3 is also omitted, $L_q$ is a physical distance between the emission portion of the laser light source 2 and the light reflection surface 300.

Therefore, $L_q$ in Relationship (3) described above is a physical distance from a reference point of the effective diameter $\varphi_x$ to the light reflection surface 300 of the optical modulator 12. The reference point of the effective diameter $\varphi_x$ is a position where the light shield 17 is disposed in the embodiment, is a position where the collimating lens 3 is disposed when the light shield 17 is omitted, and is a position of the emission portion of the laser light source 2 when the collimating lens 3 is also omitted.

When specific numerical values are put into the diameter $\varphi_{pin}$ of the opening 172 of the light shield 17, the physical distance $L_q$ between the light shield 17 and the light reflection surface 300 of the optical modulator 12, and the wavelength λ of the emission light L1 in Relationship (g) described above, a specific numerical value of the inclination angle $\theta_{qom}$ is obtained.

For example, when $L_q$=100 mm, $\varphi_{pin}$=0.8 mm, and λ=850 nm, the following Relationship (4) is derived.

$$0.26[\text{deg}] < \theta_{qom} \quad (4)$$

For example, when $L_q$=89.3 mm, $\varphi_{pin}$=0.8 mm, and λ=850 nm, the following Relationship (5) is derived.

$$0.29[\text{deg}] < \theta_{qom} \quad (5)$$

1.1.7.5. Verification of Inclination Angle $\theta_{qom}$ from Wave-Optical Viewpoint The significance of the upper limit value and the lower limit value of the inclination angle $\theta_{qom}$ is described from the geometric-optical viewpoint in the previous section, and the above description will be verified from a wave-optical viewpoint here.

In the verification from the wave-optical viewpoint, calculation using simulation software is performed. For the simulation software, for example, wave-optical analysis software VirtualLab and illumination design software LightTools are used.

Figure 7:
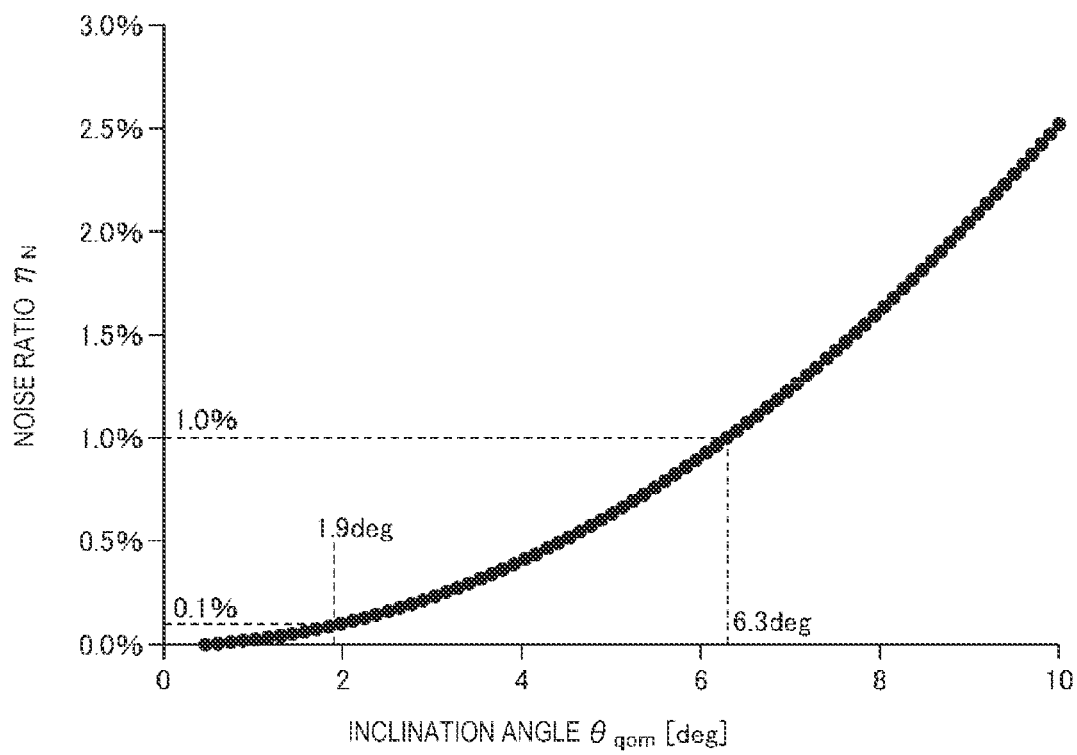
FIG. 7 is a graph showing a relationship between the inclination angle $\eta_{qom}$ and a proportion (noise ratio $\eta_N$) of an intensity of the noise component to an intensity of a beat signal component obtained by simulation.

FIG. 7 is a graph showing a relationship between the inclination angle $\theta_{qom}$ and the proportion (noise ratio $\eta_N$) of the intensity of the noise component to the intensity of the beat signal component obtained by the simulation.

The graph shown in FIG. 7 substantially coincides with the graph shown in FIG. 4. Therefore, it can be said that the inclination angle $\theta_{qom}$ from the geometric-optical viewpoint described above is also appropriate from the wave-optical viewpoint. Therefore, it can be said that the significance of the upper limit values of Relationships (1) and (2) is also supported from the wave-optical viewpoint.

In the simulation, $L_q$=89.3 mm, $\varphi_{pin}$=0.8 mm, and $\lambda$=850 nm.

Figure 8:
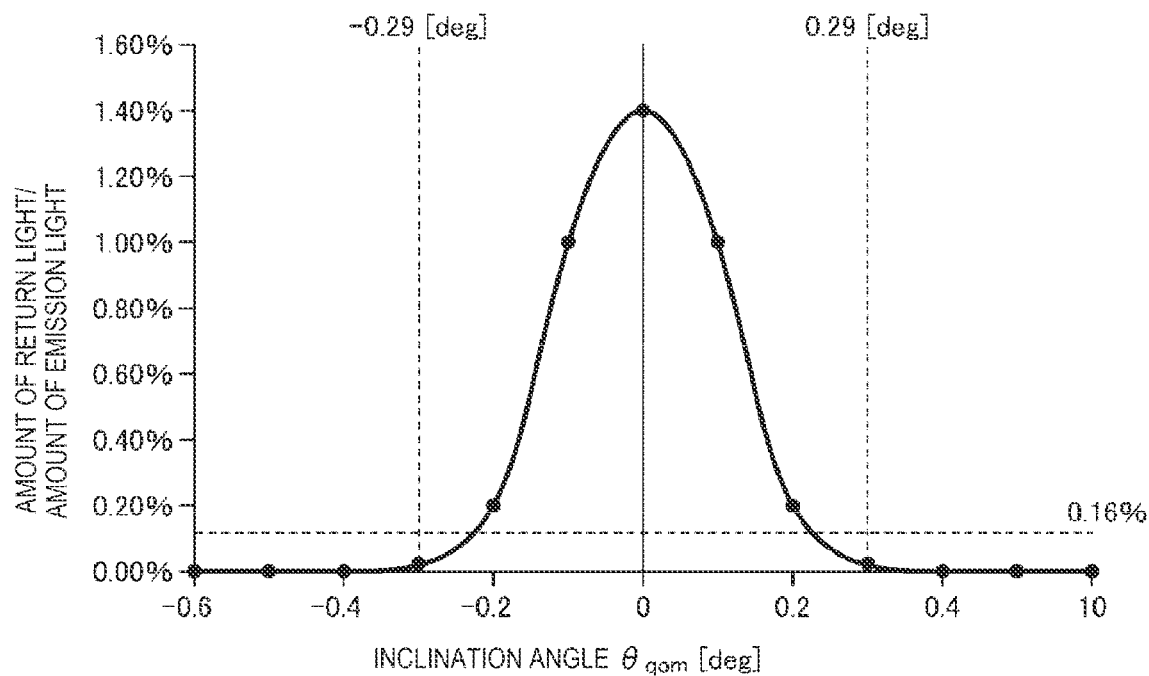
FIG. 8 is a graph showing a relationship between the inclination angle $\theta_{qom}$ and a ratio of an amount of the return light to an amount of emission light obtained by simulation.

FIG. 8 is a graph showing a relationship between the inclination angle $\theta_{qom}$ and a ratio of an amount of return light to an amount of emission light obtained by the simulation. The amount of the emission light is an amount of light of the emission light L1 emitted by passing through a range of the effective diameter $\varphi_x$ at the reference point of the effective diameter $\varphi_x$. Further, the amount of the return light is an amount of light of the return light L5 that returns within the range of the effective diameter $\varphi_x$ at the reference point of the effective diameter $\varphi_x$.

In the graph shown in FIG. 8, it is understood that the light amount ratio of the return light L5 being 0.01% or less is implemented in a range where Relationship (5) is satisfied, that is, a range where the inclination angle $\theta_{qom}$ is larger than 0.29 [deg]. The light amount ratio corresponds to an attenuation rate of optical density OD>4, and indicates that the return light L5 is sufficiently prevented. Therefore, it can be said that the significance of the lower limit value of Relationship (5) is also supported from the wave-optical viewpoint. Further, it can be said that the significance of the lower limit value of Relationship (4) is also similarly supported accordingly.

It can be said that the significance of the lower limit values of Relationship (g) used for the derivation of Relationship (4) and Relationship (5) and Relationship (3) obtained by conceptually expanding Relationship (g) is also similarly supported from the wave-optical viewpoint.

By the examination of the inventor based on past results, it is understood that a good result can be obtained if the ratio of "amount of return light/amount of emission light" shown in FIG. 8 is 0.16% or less even if the ratio deviates from the range of the inclination angle $\theta_{qom}$ described above. Therefore, depending on the configuration of the interference optical system 50, the lower limit value of the inclination angle $\theta_{qom}$ described above can be relaxed. For example, when $L_q$=89.3 mm, $\varphi_{pin}$=0.8 mm, and $\lambda$=850 nm, $\theta_{qom}$=0.25 [deg] derived from the amount of the return light/the amount of the emission light=0.16% in FIG. 8 may be the lower limit value of the inclination angle $\theta_{qom}$. That is, the inclination angle $\theta_{qom}$ preferably satisfies 0.25 [deg]<$\theta_{qom}$, more preferably satisfies 0.26 [deg]<$\theta_{qom}$, and still more preferably satisfies 0.29 [deg]<$\theta_{qom}$.

1.1.7.6. Vibrator and Diffraction Grating

Figure 9:
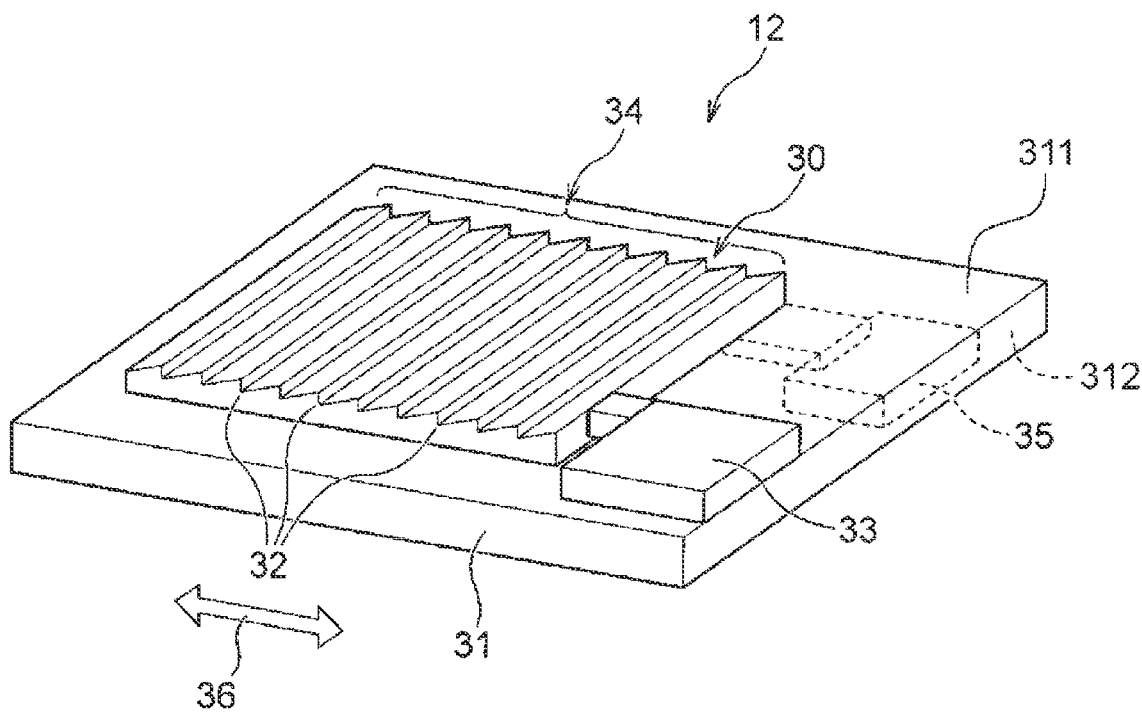
FIG. 9 is a perspective view showing a configuration example of the optical modulator in FIG. 2.

FIG. 9 is a perspective view showing a configuration example of the optical modulator 12 in FIG. 2.

As shown in FIG. 9, the optical modulator 12 includes the vibrator 30. The vibrator 30 includes a plate-shaped resonator element 31 and a diffraction grating 34 provided at the resonator element 31.

The resonator element 31 is made of a material that repeats a mode in which the resonator element 31 vibrates to be distorted in a direction along a surface by being applied with a potential. The resonator element 31 shown in FIG. 9 is a quartz crystal AT resonator that performs thickness-shear vibration along a vibration direction 36 in a high-frequency region of an MHz band. Further, the diffraction grating 34 is provided at a surface of the resonator element 31. The diffraction grating 34 includes grooves 32 having components that intersect the vibration direction 36, that is, a plurality of linear-shaped grooves 32 that extend in a direction intersecting the vibration direction 36.

The resonator element 31 includes a front surface 311 and a back surface 312 having a front-back relationship with each other. The diffraction grating 34 is disposed at the front surface 311. Further, a pad 33 for applying a potential to the resonator element 31 is provided at the front surface 311. On the other hand, a pad 35 for applying a potential to the resonator element 31 is provided at the back surface 312.

A size of the resonator element 31 is, for example, about 0.5 mm or more and 10.0 mm or less in a long side. Further, thickness of the resonator element 31 is, for example, about 0.10 mm or more and 2.0 mm or less. As an example, a shape of the resonator element 31 is a square whose one side is 1.6 mm, and a thickness thereof is 0.35 mm.

A size of the diffraction grating 34 is, for example, about 0.2 mm or more and 3.0 mm or less in a long side. Further, a thickness of the diffraction grating 34 is, for example, about 0.003 mm or more and 0.5 mm or less.

In the embodiment, the resonator element 31 performs the thickness-shear vibration. However, since the vibration is an in-plane vibration as shown in FIG. 9 as the vibration direction 36, the optical modulation cannot be performed even if the light is vertically incident on a surface of the single resonator element 31. Therefore, in the optical modulator 12, the optical modulation can be performed by providing the diffraction grating 34 at the resonator element 31.

The diffraction grating 34 shown in FIG. 9 is a blazed diffraction grating as an example. The blazed diffraction grating refers to a diffraction grating having a stepped cross-sectional shape. The shape of the diffraction grating 34 is not limited thereto. Further, when the vibration direction 36 of the resonator element 31 includes a component parallel to an incident direction of the emission light L1 incident on the optical modulator 12, for example, when the resonator element 31 is an element that vibrates in a direction having a component orthogonal to a plane including the front surface 311 in FIG. 9, the diffraction grating 34 may be omitted.

The resonator element 31 may be a Si resonator, a surface acoustic wave (SAW) device, a ceramic resonator, or the like, in addition to the quartz crystal resonator described above.

Figure 10:
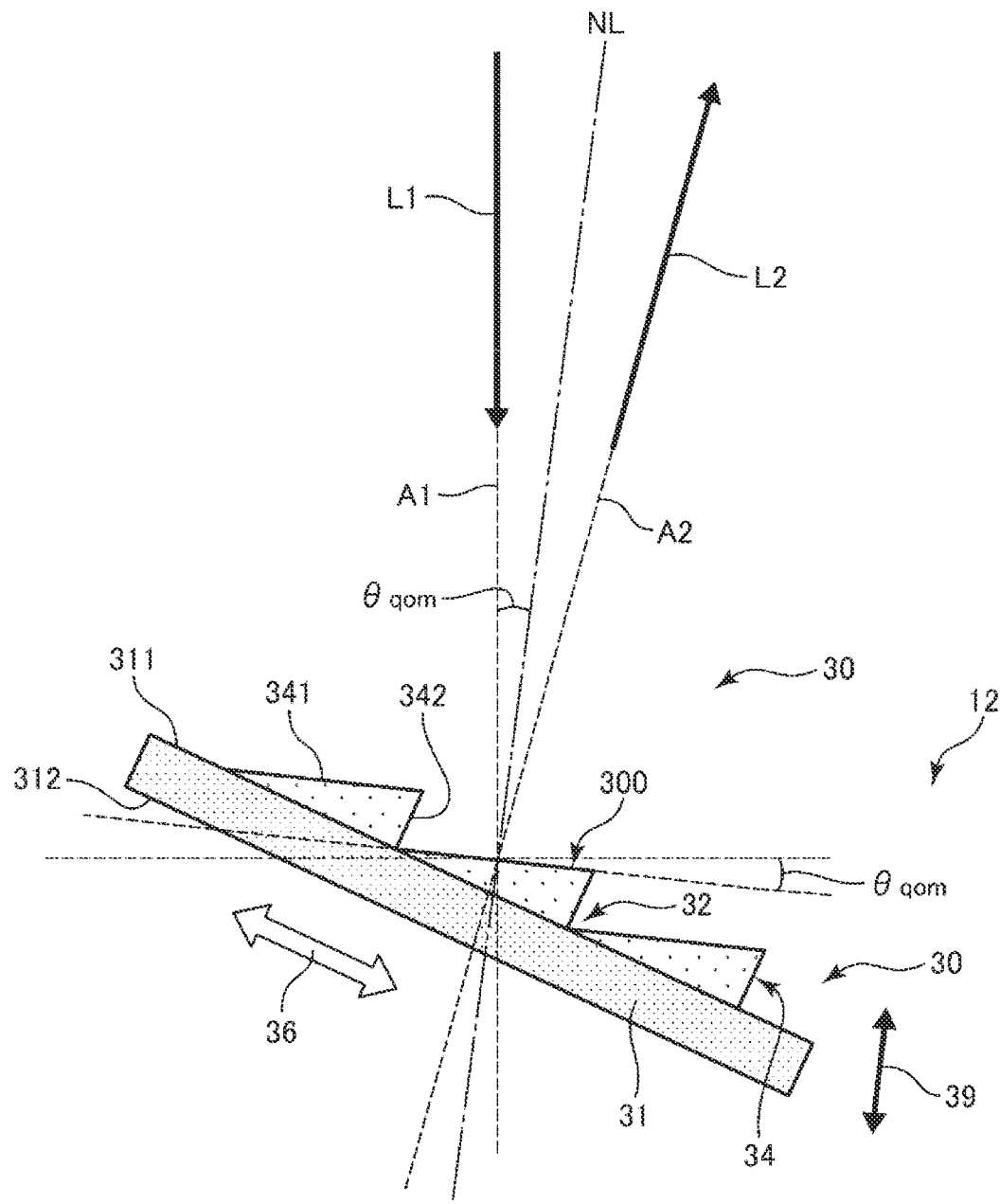
FIG. 10 is a cross-sectional view showing a vicinity of a light reflection surface of the optical modulator shown in FIG. 9.

FIG. 10 is a cross-sectional view showing a vicinity of the light reflection surface 300 of the optical modulator 12 shown in FIG. 9.

The groove 32 provided in the diffraction grating 34 shown in FIG. 10 includes a gentle slope 341 and a steep slope 342. The gentle slope 341 is disposed at an angle gentler than that of the steep slope 342 with respect to the front surface 311 of the resonator element 31. In a case of the blazed diffraction grating, the gentle slope 341 is also referred to as a blaze surface.

The emission light L1 incident on the diffraction grating 34 exhibits highest diffraction efficiency in a direction of specular reflection on the gentle slope 341. In the embodiment, a plane parallel to the gentle slope 341 can be considered as the "light reflection surface 300". The optical modulator 12 shown in FIG. 10 is an example in which an angle defined by a normal line NL of the gentle slope 341 and the incident optical axis A1 is set to Littrow arrangement when the inclination angle $\theta_{qom}$ is 0 [deg]. In the example, when the inclination angle $\theta_{qom}$ is larger than zero, the reference light L2 is emitted at a diffraction angle the same as the inclination angle $\theta_{qom}$.

When the resonator element 31 performs the in-plane vibration along the vibration direction 36 shown in FIG. 10, the gentle slope 341 of the diffraction grating 34 performs out-of-plane vibration along a vibration direction 39. Therefore, when the emission light L1 is incident on the gentle slope 341, the emission light L1 can be optically modulated. It is possible to generate the reference light L2 including the modulation signal.

1.2. Signal Generation Unit

The signal generation unit 60 shown in FIG. 1 outputs a drive signal Sd input to the vibrator 30 and a reference signal Ss input to the calculation unit 52.

In the embodiment, as shown in FIG. 1, the signal generation unit 60 includes an oscillation circuit 61. The oscillation circuit 61 operates the vibrator 30 as a signal source, and generates a highly accurate periodic signal. Accordingly, the oscillation circuit 61 outputs the highly accurate drive signal Sd, and outputs the reference signal Ss. Accordingly, when subjected to the disturbance, the drive signal Sd and the reference signal Ss are influenced in the same manner with each other. As a result, the modulation signal added via the vibrator 30 driven in response to the drive signal Sd and the reference signal Ss are influenced in the same manner with each other. Therefore, when the modulation signal and the reference signal Ss are subjected to calculation in the calculation unit 52, the influence of the disturbance included in both the signals can be canceled or reduced with each other in a process of the calculation. As a result, even if the signals are subjected to the disturbance, the calculation unit 52 can accurately obtain the position and the speed of the object 14.

Examples of the oscillation circuit 61 include an oscillation circuit disclosed in JP-A-2022-38156.

The signal generation unit 60 may include a signal generator such as a function generator or a signal generator instead of the oscillation circuit 61.

2. Main Body

The main body 59 shown in FIG. 1 includes the calculation unit 52. The calculation unit 52 includes a preprocessing unit 53, a demodulation processing unit 55, and a demodulated signal output unit 57. Functions exhibited by the functional units are implemented by hardware including, for example, a processor, a memory, an external interface, an input unit, and a display unit. Specifically, the functions are implemented by the processor reading and executing a program stored in the memory. The components can communicate with one another by an internal bus.

Examples of the processor include a central processing unit (CPU) and a digital signal processor (DSP). Instead of using the method in which the processors execute the software, a method in which a field-programmable gate array (FPGA), an application specific integrated circuit (ASIC), and the like implement the functions described above may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB), and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel.

The external interface, the input unit, and the display unit may be provided when necessary and may be omitted.

For example, a preprocessing unit and a demodulation unit disclosed in JP-A-2022-38156 can be applied to the preprocessing unit 53 and the demodulation processing unit 55.

The preprocessing unit 53 performs preprocessing on the light-receiving signal based on the reference signal Ss. In the preprocessing, after the light-receiving signal is divided into two signals PASS1 and PASS2, one of two signals PASS1 and PASS2 is multiplied by the reference signal, and then the two signals PASS1 and PASS2 are added to output a preprocessed signal.

The demodulation processing unit 55 demodulates a sample signal corresponding to the speed and the position of the object 14 based on the reference signal Ss from the preprocessed signal output from the preprocessing unit 53.

The demodulated signal output unit 57 performs phase coupling by performing, for example, phase unwrapping processing on a demodulated signal output from the demodulation processing unit 55. Accordingly, the position of the object 14 is calculated. Accordingly, the laser interferometer 1 is a displacement meter. Further, it is possible to obtain the speed based on the position of the object 14. Accordingly, the laser interferometer 1 is a speed meter.

3. Effects of Embodiment

As described above, the laser interferometer 1 according to the embodiment includes the laser light source 2, the optical modulator 12, and the light-receiving element 10 (photodetector). The laser light source 2 emits the emission light L1 that is the laser light. The optical modulator 12 includes the vibrator 30 that vibrates in response to the drive signal Sd and the light reflection surface 300 provided at the vibrator 30, and overlaps the modulation signal on the emission light L1 by reflecting the emission light L1 on the light reflection surface 300 that vibrates. The light-receiving element 10 receives the interference light (laser light) including the sample signal derived from the object 14 and the modulation signal described above, and outputs the light-receiving signal. In the laser interferometer 1, when an angle defined by the normal line NL of the light reflection surface 300 and the incident optical axis A1 of the emission light L1 incident on the light reflection surface 300 is the inclination angle $\theta_{qom}$, the following Relationship (1) is satisfied.

$$0[\deg]<\theta_{qom}<5.7[\deg] \quad (1)$$

According to such a configuration, it is possible to prevent the decrease in the S/N ratio of the light-receiving signal due to the unmodulated component while preventing the destabilization of the laser oscillation in the laser light source 2 due to the return light L5. As a result, when the displacement and the speed of the object 14 are measured by the laser interferometer 1, sufficiently high measurement accuracy can be achieved.

Further, the inclination angle $\theta_{qom}$ may satisfy the following Relationship (2).

$$0[\text{deg}] < \theta_{qom} < 1.8[\text{deg}] \tag{2}$$

Accordingly, the decrease in the S/N ratio of the light-receiving signal can be further reduced. As a result, when the displacement and the speed of the object 14 are measured by the laser interferometer 1, higher measurement accuracy can be implemented.

The laser interferometer 1 according to the embodiment includes the light splitter 4. After splitting the emission light L1 (laser light) emitted from the laser light source 2, the light splitter 4 irradiates the optical modulator 12 with the first split light L1a (one part of the laser light), and irradiates the object 14 with the second split light L1b (the other part of the laser light), and then mixes the reference light L2 (the laser light that returns from the optical modulator 12) with the object light L3 (the laser light that returns from the object 14).

According to such a configuration, since the laser light can be split and mixed by the light splitter 4, the space of the interference optical system 50 can be saved, which can contribute to the miniaturization of the laser interferometer 1.

The laser interferometer 1 according to the embodiment includes the light shield 17. The light shield 17 is disposed between the laser light source 2 and the light splitter 4, and has the opening 172 through which the emission light L1 (laser light) passes.

Accordingly, it is possible to prevent the return light L5 generated at the optical modulator 12, the object 14, or the like from being incident on the laser light source 2.

When the wavelength of the emission light L1 (laser light) emitted from the laser light source 2 is A, the effective diameter of the emission light L1 emitted from the laser light source 2 is $\varphi_x$, and the physical distance from a reference point of the effective diameter to the optical modulator 12 is $L_q$, the laser interferometer 1 may satisfy the following Relationship (3).

$$\frac{1}{2}\tan^{-1}\left(\frac{\phi_\kappa}{L_q} + \frac{\lambda}{\phi_\kappa}\right) < \theta_{qom} \tag{3}$$

Accordingly, even if a part of the reference light L2 is the return light L5, it is possible to reduce a probability that the return light L5 reaches the emission portion of the laser light source 2. As a result, it is possible to particularly prevent the destabilization of the laser oscillation.

Further, the inclination angle $\varphi_{qom}$ may satisfy the following Relationship (4).

$$0.26[\text{deg}] < \theta_{qom} \tag{4}$$

Accordingly, even if a part of the reference light L2 is the return light L5, it is possible to reduce the probability that the return light L5 reaches the emission portion of the laser light source 2. As a result, it is possible to particularly prevent the destabilization of the laser oscillation.

The inclination angle $\theta_{qom}$ may be set such that, when a part of the reference light L2 (laser light) reflected by the light reflection surface 300 returns to the reference point of the effective diameter described above, the ratio of the amount of the return light that returns within the range of the effective diameter to the amount of the emission light within the range of the effective diameter is 0.16% or less.

Accordingly, even if a part of the reference light L2 is the return light L5, it is possible to reduce the probability that the return light L5 reaches the emission portion of the laser light source 2. As a result, it is possible to particularly prevent the destabilization of the laser oscillation.

The laser interferometer of the present disclosure has been described above based on the shown embodiment, but the laser interferometer of the present disclosure is not limited to the embodiment, and the configuration of each part can be replaced with any configuration having a similar function. Further, any other component may be added to the laser interferometer according to the embodiment.

The laser interferometer of the present disclosure can also be applied to, for example, a vibrometer, a clinometer, and a distance meter (length-measuring device), in addition to the displacement meter and the speed meter described above. Further, examples of application of the laser interferometer of the present disclosure include an optical comb interference measurement technique that can perform distance measurement, 3D imaging, spectroscopy, and the like, a fiber optic gyro that implements an angular velocity sensor, an angular acceleration sensor, and the like, and a Fourier spectrometer including a moving mirror device.

Two or more of the light source, the optical modulator, and the light-receiving element may be placed on the same substrate. Accordingly, miniaturization and weight reduction of the interference optical system can be easily achieved, and easiness of assembly can be improved.

The embodiment includes the so-called Michelson interference optical system, and the laser interferometer of the present disclosure can be applied to a disclosure including another type of interference optical system, for example, a Mach-Zehnder interference optical system.

The embodiment is configured such that the interference light of the reference light L2 and the object light L3 is incident on the photodetector. Alternatively, since the laser light including the sample signal and the modulation signal may be incident on the photodetector, the optical path along which the laser light travels is not limited to the embodiment. For example, the interference optical system may be configured such that the laser light emitted from the laser light source is sequential via the optical modulator and the object and incident on the photodetector. On the contrary, the interference optical system may be configured such that the laser light emitted from the laser light source is sequential via the object and the optical modulator and incident on the photodetector.

What is claimed is:

1. A laser interferometer comprising:
   a laser light source configured to emit laser light;
   an optical modulator including a vibrator that has a light reflection surface and vibrates in response to a drive signal, the optical modulator being configured to overlap a modulation signal on the laser light by reflecting the laser light on the light reflection surface; and
   a photodetector configured to receive the laser light including a sample signal derived from an object and the modulation signal, and to output a light-receiving signal, wherein $$0[\text{deg}] < \theta_{qom} < 5.7[\text{deg}] \tag{1}$$

the above Relationship (1) is satisfied, where an inclination angle $\theta_{qom}$ is defined by a normal line of the light reflection surface and an incident optical axis of the laser light incident on the light reflection surface.

2. The laser interferometer according to claim 1, wherein $$0[\text{deg}] < \theta_{qom} < 1.8[\text{deg}] \qquad (2)$$

the inclination angle $\theta_{qom}$ satisfies the above Relationship (2).

3. The laser interferometer according to claim 2, further comprising:
a light splitter configured to, after splitting the laser light emitted from the laser light source, irradiate the optical modulator with one part of the laser light and irradiate the object with another part of the laser light, and then mix the laser light that returns from the optical modulator with the laser light that returns from the object.

4. The laser interferometer according to claim 3, further comprising:
a light shield disposed between the laser light source and the light splitter, the light shield having an opening through which the laser light passes.

5. The laser interferometer according to claim 2, wherein $$\frac{1}{2}\tan^{-1}\left(\frac{\phi_\kappa}{L_q} + \frac{\lambda}{\phi_\kappa}\right) < \theta_{qom} \qquad (3)$$

the above Relationship (3) is satisfied, where a wavelength of the laser light emitted from the laser light source is $\lambda$, an effective diameter of the laser light emitted from the laser light source is $\varphi_k$, and a physical distance from a reference point of the effective diameter to the optical modulator is $L_q$.

6. The laser interferometer according to claim 5, wherein
the inclination angle $\theta_{qom}$ is set such that when a part of the laser light reflected by the light reflection surface returns to the reference point of the effective diameter, a ratio of an amount of return light that returns within a range of the effective diameter to an amount of the emission light within the range of the effective diameter is 0.16% or less.

7. The laser interferometer according to claim 2, wherein $$0.26[\text{deg}] < \theta_{qom} < 1.8[\text{deg}] \qquad (5)$$

the inclination angle $\theta_{qom}$ satisfies the above-Relationship (4) Relationship (5).

8. The laser interferometer according to claim 1, further comprising:
a light splitter configured to, after splitting the laser light emitted from the laser light source, irradiate the optical modulator with one part of the laser light and irradiate the object with another part of the laser light, and then mix the laser light that returns from the optical modulator with the laser light that returns from the object.

9. The laser interferometer according to claim 8, further comprising:
a light shield disposed between the laser light source and the light splitter, the light shield having an opening through which the laser light passes.

10. The laser interferometer according to claim 1, wherein $$\frac{1}{2}\tan^{-1}\left(\frac{\phi_\kappa}{L_q} + \frac{\lambda}{\phi_\kappa}\right) < \theta_{qom} \qquad (3)$$

the above Relationship (3) is satisfied, where a wavelength of the laser light emitted from the laser light source is $\lambda$, an effective diameter of the laser light emitted from the laser light source is $\varphi_k$, and a physical distance from a reference point of the effective diameter to the optical modulator is $L_q$.

11. The laser interferometer according to claim 10, wherein
the inclination angle $\theta_{qom}$ is set such that when a part of the laser light reflected by the light reflection surface returns to the reference point of the effective diameter, a ratio of an amount of return light that returns within a range of the effective diameter to an amount of the emission light within the range of the effective diameter is 0.16% or less.

12. The laser interferometer according to claim 1, wherein $$0.26[\text{deg}] < \theta_{qom} < 5.7[\text{deg}] \qquad (4)$$

the inclination angle $\theta_{qom}$ satisfies the above Relationship (4).

* * * * *